US008837784B2

(12) United States Patent
Jeronimus et al.

(10) Patent No.: US 8,837,784 B2
(45) Date of Patent: *Sep. 16, 2014

(54) BIOMETRIC BASED AUTHORIZATION SYSTEMS FOR ELECTRONIC FUND TRANSFERS

(71) Applicant: The Western Union Company, Englewood, CO (US)

(72) Inventors: Michael Jeronimus, Highlands Ranch, CO (US); Ken Algiene, Littleton, CO (US); Scott R. Paintin, Littleton, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,186

(22) Filed: Dec. 20, 2012

(65) Prior Publication Data
US 2013/0238501 A1    Sep. 12, 2013

Related U.S. Application Data

(63) Continuation of application No. 11/562,371, filed on Nov. 21, 2006, now Pat. No. 8,345,931.

(60) Provisional application No. 60/772,406, filed on Feb. 10, 2006.

(51) Int. Cl.
*G06K 9/00* (2006.01)
*G06Q 20/40* (2012.01)
*G06Q 20/10* (2012.01)

(52) U.S. Cl.
CPC .......... *G06Q 20/40145* (2013.01); *G06Q 20/40* (2013.01); *G06Q 20/10* (2013.01)
USPC ........... 382/115; 382/137; 382/273; 235/379; 235/380; 705/44

(58) Field of Classification Search
USPC ........... 382/105, 115; 235/379, 380, 381, 382
See application file for complete search history.

(56) References Cited

U.S. PATENT DOCUMENTS 3,599,151 A    8/1971    Harr
3,833,395 A    9/1974    Gosnell
(Continued)

FOREIGN PATENT DOCUMENTS

AU    2007215483 B2    7/2010
EP    0481135 A1    4/1992
(Continued)

OTHER PUBLICATIONS

U.S. Appl. No. 10/047,917, filed Jan. 14, 2002, Kroon.
(Continued)

*Primary Examiner* — Vu Le
*Assistant Examiner* — Aklilu Woldemariam
(74) *Attorney, Agent, or Firm* — Kilpatrick Townsend & Stockton LLP

(57) ABSTRACT

A money transfer authorization method that includes the step of providing transferor biometric information to a party verification processor that verifies an identity of the transferor by comparing the transferor biometric information with previously registered biometric information from the transferor, where the transferor provides transfer identity information to receive the money. The method also includes confirming that the verified transferor has sufficient funds or credit for the money transfer, and providing transferee biometric identification to the party verification processor that verifies the transferee by comparing the transferee biometric information with previously registered biometric information from the transferee. The transferee has to provide transfer identity information before the money is given to the transferee.

20 Claims, 5 Drawing Sheets

(56) References Cited

U.S. PATENT DOCUMENTS

| | | |
|---|---|---|
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,812,628 A | 3/1989 | Boston et al. |
| 4,882,475 A | 11/1989 | Miller et al. |
| 4,902,881 A | 2/1990 | Janku |
| 4,961,142 A | 10/1990 | Elliott et al. |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,367,452 A | 11/1994 | Gallery et al. |
| 5,408,077 A | 4/1995 | Campo et al. |
| 5,426,594 A | 6/1995 | Wright et al. |
| 5,457,747 A * | 10/1995 | Drexler et al. ............... 713/186 |
| 5,464,971 A | 11/1995 | Sutcliffe et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,555,496 A | 9/1996 | Tackbary et al. |
| 5,577,109 A | 11/1996 | Stimson et al. |
| 5,622,388 A | 4/1997 | Alcordo |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,757,917 A | 5/1998 | Rose et al. |
| 5,764,789 A * | 6/1998 | Pare et al. ............... 382/115 |
| 5,794,207 A | 8/1998 | Walker et al. |
| 5,815,657 A | 9/1998 | Williams et al. |
| 5,825,617 A | 10/1998 | Kochis et al. |
| 5,825,871 A * | 10/1998 | Mark .................... 379/357.03 |
| 5,826,241 A | 10/1998 | Stein et al. |
| 5,828,875 A | 10/1998 | Halvarsson et al. |
| 5,832,463 A | 11/1998 | Funk |
| 5,832,464 A * | 11/1998 | Houvener et al. ............... 705/45 |
| 5,878,211 A | 3/1999 | Delagrange et al. |
| 5,893,080 A | 4/1999 | McGurl et al. |
| 5,910,988 A | 6/1999 | Ballard |
| 5,949,044 A | 9/1999 | Walker et al. |
| 5,960,412 A | 9/1999 | Tackbary et al. |
| 5,987,426 A | 11/1999 | Goodwil, III |
| 6,012,048 A | 1/2000 | Gustin et al. |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,039,245 A | 3/2000 | Symonds et al. |
| 6,058,417 A | 5/2000 | Hess et al. |
| 6,064,990 A | 5/2000 | Goldsmith |
| 6,070,798 A | 6/2000 | Nethery |
| 6,097,834 A | 8/2000 | Krouse et al. |
| 6,106,020 A | 8/2000 | Leef et al. |
| 6,119,106 A | 9/2000 | Mersky et al. |
| 6,122,625 A | 9/2000 | Rosen |
| 6,149,055 A | 11/2000 | Gatto |
| 6,149,056 A | 11/2000 | Stinson et al. |
| 6,164,528 A | 12/2000 | Hills et al. |
| 6,175,823 B1 | 1/2001 | Van Dusen |
| 6,193,152 B1 | 2/2001 | Fernando et al. |
| 6,199,761 B1 | 3/2001 | Drexler |
| 6,243,689 B1 | 6/2001 | Norton |
| 6,246,996 B1 | 6/2001 | Stein et al. |
| 6,269,348 B1 | 7/2001 | Pare, Jr. et al. |
| 6,270,011 B1 | 8/2001 | Gottfried |
| 6,305,604 B1 | 10/2001 | Ono |
| 6,308,887 B1 | 10/2001 | Korman et al. |
| 6,321,984 B1 | 11/2001 | McCall et al. |
| 6,327,570 B1 | 12/2001 | Stevens |
| 6,327,575 B1 | 12/2001 | Katz |
| 6,360,254 B1 | 3/2002 | Linden et al. |
| 6,363,485 B1 | 3/2002 | Adams et al. |
| 6,367,693 B1 | 4/2002 | Novogrod |
| 6,434,259 B1 * | 8/2002 | Hamid et al. ............... 382/115 |
| 6,484,936 B1 | 11/2002 | Nicoll et al. |
| 6,523,745 B1 | 2/2003 | Tamori |
| 6,539,363 B1 | 3/2003 | Allgeier et al. |
| 6,547,132 B1 | 4/2003 | Templeton et al. |
| 6,549,119 B1 | 4/2003 | Turner |
| 6,690,673 B1 | 2/2004 | Jarvis |
| 6,827,260 B2 | 12/2004 | Stoutenburg et al. |
| 6,883,709 B2 | 4/2005 | Joseph |
| 6,886,742 B2 | 5/2005 | Stoutenburg et al. |
| 6,898,299 B1 * | 5/2005 | Brooks .................... 382/115 |
| 6,907,408 B2 | 6/2005 | Angel |
| 6,914,517 B2 | 7/2005 | Kinsella |
| 6,950,810 B2 | 9/2005 | Lapsley et al. |
| 6,957,770 B1 * | 10/2005 | Robinson .................... 235/382 |
| 6,978,019 B1 * | 12/2005 | Lapstun et al. ............... 380/51 |
| 6,983,882 B2 | 1/2006 | Cassone |
| 7,086,584 B2 | 8/2006 | Stoutenburg et al. |
| 7,303,120 B2 * | 12/2007 | Beenau et al. ............... 235/380 |
| 7,600,673 B2 | 10/2009 | Stoutenburg et al. |
| 7,770,019 B2 * | 8/2010 | Ferren et al. ............... 713/186 |
| 8,345,931 B2 | 1/2013 | Jeronimus et al. |
| 2001/0051876 A1 | 12/2001 | Seigel et al. |
| 2002/0122571 A1 | 9/2002 | Bradley et al. |
| 2002/0153414 A1 | 10/2002 | Stoutenburg et al. |
| 2002/0156683 A1 | 10/2002 | Stoutenburg et al. |
| 2002/0166891 A1 | 11/2002 | Stoutenburg et al. |
| 2003/0069856 A1 | 4/2003 | Seifert et al. |
| 2003/0070080 A1 | 4/2003 | Rosen |
| 2003/0163417 A1 | 8/2003 | Cachey et al. |
| 2003/0222135 A1 | 12/2003 | Stoutenburg et al. |
| 2004/0153421 A1 | 8/2004 | Robinson |
| 2004/0169722 A1 * | 9/2004 | Pena ................... 348/14.01 |
| 2004/0215557 A1 | 10/2004 | Michelsen et al. |
| 2004/0215574 A1 | 10/2004 | Michelsen et al. |
| 2005/0097037 A1 * | 5/2005 | Tibor .................... 705/39 |
| 2005/0125360 A1 | 6/2005 | Tidwell et al. |
| 2005/0254689 A1 * | 11/2005 | Bouillon .................... 382/115 |
| 2006/0078177 A1 * | 4/2006 | Niinuma et al. ............... 382/124 |
| 2006/0212407 A1 * | 9/2006 | Lyon .................... 705/71 |
| 2006/0265602 A1 | 11/2006 | Robinson |
| 2007/0208662 A1 | 9/2007 | Jeronimus et al. |
| 2008/0016002 A1 * | 1/2008 | Beenau et al. ............... 705/64 |
| 2008/0095410 A1 * | 4/2008 | Shalev et al. ............... 382/115 |

FOREIGN PATENT DOCUMENTS

| | | |
|---|---|---|
| EP | 0949596 A2 | 10/1999 |
| EP | 1077436 A2 | 2/2001 |
| WO | 00/46725 A1 | 8/2000 |
| WO | 00/67177 A2 | 11/2000 |
| WO | 01/04816 A1 | 1/2001 |
| WO | 02/05195 A1 | 1/2002 |
| WO | 2007/095002 A2 | 8/2007 |

OTHER PUBLICATIONS

U.S. Appl. No. 10/773,642, filed Feb. 6, 2004, Sgambati, et al.

Author Unknown, "E-Commerce, Email and E-greeting Cards Combine in New Web Site Designed by Interactive Bureau", Business Wire, Sep. 14, 1999, (abstract), [online] [retrieved on May 1, 2002], retrieved from PROQUEST Database, 2 pages.

Author Unknown, "Pumper's Premium is First to Implement Verifone's VeriPASS Contactless Smart Card Payment System at All Sites," Business Wire, Feb. 20, 2001, 4 pages. Accessed at: http://www.thefreelibrary.com/Pumper's+Premium. . . .

Author Unknown, "Risk Management Services", Concord EFS, Inc. brochure, published on or before 2005, 8 pages.

Author Unknown, "Risk Management Services: IDLogix C100 Handheld Terminal—Detecting Invalid and Counterfeit Identification", Concord EFS, Inc. brochure, published on or before 2005, 4 pages.

(56) References Cited

OTHER PUBLICATIONS

Author Unknown, "PayPal.com, How PayPal.com Works," CONFINITY, Inc., downloaded from website http://www.paypal.com on Feb. 7, 2000, 7 pages.

Author Unknown, "The Way to Send and Receive Money on the Internet," DOTBANK, downloaded from website http://www.dotbank.com, Feb. 7, 2000, 7 pages.

Author Unknown, "PayMe.com," IDEALAB Company, downloaded from website http://ssl.idealab.com on Feb. 16, 2000, 7 pages.

Author Unknown, "GiftSpot.com Simplifies Gift-Giving on the Internet," PR Newswire, Oct. 20, 1999, (abstract), [online] retrieved on May 1, 2002], retrieved from PROQUEST Database, 3 pages.

Author Unknown, "Deposit Chek—Preventing Losses on . . . Checks and Other Payments at Financial Institutions", Primary Payment Systems, Inc., 2002, 2 pages.

Author Unknown, "Risk Management Services: Decision Chek On-Site-Detecting Fraudulent Checks at the Point-of-Sale", Primary Payment Systems, Inc., 2003, 4 pages.

Author Unknown, "Risk Management Services: Decision Chek—Preventing Check Losses at the Point-of-Presentment", Primary Payment Systems, Inc., 2003, 4 pages.

Author Unknown, "Risk Management Services: Identity Chek-Detecting Fraud when Establishing New Relationships", Primary Payment Systems, Inc., 2003, 6 pages.

Author Unknown, "Risk Management Services: Identity Chek—Web and Developer Service", Primary Payment Systems, Inc., 2003, 4 pages.

Author Unknown, "Fast, Low-Cost Transaction Automation at the Point of Service", VeriFone Finance , Jan. 1999 , 2 pages.

Author Unknown, "Do More with Your Money," X.com, downloaded from website http://www.x.com, Feb. 7, 2000, 5 pages.

International Search Report and Written Opinion of PCT/US2007/3115 mailed on Feb. 14, 2008, 8 pages.

\* cited by examiner

BIOMETRIC BASED AUTHORIZATION SYSTEMS FOR ELECTRONIC FUND TRANSFERS

CROSS-REFERENCES TO RELATED APPLICATIONS

This application claims priority to, and is a continuation of, U.S. Pat. No. 8,345,931, filed Nov. 21, 2006, issued Jan. 1, 2013, and titled "Biometric Based Authorization Systems For Electronic Fund Transfers," which claims priority to U.S. Provisional App. No. 60/772,406, filed Feb. 10, 2006, and titled "Biometric Based Authorization Systems For Electronic Fund Transfers," the entire contents of which are herein incorporated by reference for all purposes, as if fully set forth herein.

BACKGROUND OF THE INVENTION

An important activity in all corporations and governments is to prevent the diversion of capital into criminal enterprises. In the mid-1980s, trafficking in illegal drugs in the United States had reached a level where the federal government felt compelled to increase the monitoring of financial transactions for drug related activity. In 1986 the United States Congress modified the Bank Secrecy Act to require all transactions conducted thorough U.S. financial institutions for more than $10,000 to be reported to appropriate government monitoring agencies. The intent of the law was to make drug traffickers fearful of using the U.S. financial infrastructure to allocate capital for drug trafficking enterprises.

The $10,000 reporting threshold was enacted in a time when the financial infrastructure was much more centralized around banks and savings and loan institutions. Perhaps more significantly, the law was enacted when parties had fewer options for transferring money. Credit card transactions were not nearly as commonplace as today, and debit card, stored value card, and ATM card transactions were in their infancy. The majority of financial transactions at that time involved financial accounts administered by government regulated financial institutions (e.g., checking and savings accounts).

After the terrorist attacks of Sep. 11, 2001, the United States required even closer scrutiny of the financial transactions of terrorist organizations was needed. But the ease with which small transactions can be conducted for well under the $10,000 reporting threshold has made monitoring very difficult.

Trying to shrink and recentralize the financial infrastructure for easier monitoring would be nearly impossible and unacceptably costly. Approximately two-thirds of the economic activity in the United States depends on consumer spending. Restricting consumers' payment choices could have a dramatic impact on their spending and the overall economy. Also, the financial infrastructure has been globalized to a great extent, making it impossible for the United States to make dramatic changes without the voluntary cooperation of many other countries. Thus, there is a need for technological solutions that increase the effectiveness of financial transaction monitoring without unduly interfering with the growth and sophistication of our financial infrastructure.

In addition to national security concerns, the challenges posed for monitoring the financial infrastructure poses economic threats to businesses and individuals. The financial industry is well aware of the increased threats of theft and fraud that criminals are exploiting in new innovations of the financial infrastructure. These threats include increased payment card theft, breaches in Internet security, and ever more sophisticated forms of identity theft, among many others. The financial industry is constantly taking steps to improve security in the financial infrastructure. But despite industry efforts, economic losses from financial fraud and theft are now estimated at more than a billion dollars annually, and the losses are growing. A diversion of even a small portion of these losses to finance terrorist activity presents a significant threat to national security. Thus, there is also a need for technological solutions that increase the effectiveness of financial monitoring to stop losses from theft and fraud.

One aspect of financial transaction monitoring is verifying the identity of the parties involved in the transaction. Payment transactions conducted at merchant stores and across the Internet typically involve the use of PIN numbers, passwords, machine address codes, and/or signatures to verify the identities of the parties to the transaction. Thus there is a need for new systems and methods to verify the identities of parties to a financial transaction. These and other problems are address by the present invention.

BRIEF SUMMARY OF THE INVENTION

Embodiments of the invention include a money transfer authorization method that includes the step of providing transferor biometric information to a party verification processor that verifies an identity of the transferor by comparing the transferor biometric information with previously registered biometric information from the transferor, where the transferor identifies a transferee to receive the money. The method also includes confirming that the verified transferor has sufficient funds or credit for the money transfer, and providing transferee biometric identification to the party verification processor that verifies the transferee by comparing the transferee biometric information with previously registered biometric information from the transferee. The transferee has to provide transfer identity information before the money is given to the transferee.

Embodiments of the invention also include an electronic money transfer system for transferring money from a transferor to a transferee. The system may include a party verification processor coupled to a database that stores biometric registration information provided by the transferor and the transferee during a party registration process. The system may also include a biometric input device that generates biometric transaction information from the transferor and the transferee during a money transfer process, and a data input device that allows the transferee to provide an identity of the transferor to the electronic money transfer system. In addition, the system may have a money distribution device that provides money to the verified transferee. The system is configured so the transferee does not receive the money until the party verification processor verifies the identities of the transferor and transferee by comparing the biometric transaction information with the biometric registration information from the transferor and transferee. The transferee also has to provide transfer identity information before receiving the money.

Embodiments of the invention still further include a method of transferring an amount of money between a transferor and a transferee. The method may include inputting, by the transferor, the amount of money to be transferred at a first money transfer device at the transferor's location, where an identity of the transferor is verified with transferor biometric data input into the first device by the transferor. The method may also include receiving the amount of money at a second money transfer device at the transferee's location, where the transferee does not receive the money until an identity of the transferee is verified with transferee biometric data input into the second device by the transferee, and the transferee inputs transfer identity information into the second device.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Money transfers are described where the identity of both the transferor and the transferee are verified by biometric information. As an added security and verification feature, the transferee may be required to provide transfer identity information before receiving the money. This transfer identity information may include a money transfer transaction number that is an alpha-numeric code number that uniquely identifies the money transfer. The transfer identity information may also include the identity of the transferor.

The identify verification system may be used for money transfers of any amount, including amounts below the government reporting thresholds. Records of the transactions between verified transferors and transferees may be stored and searched by authorized persons when fraudulent and/or illegal money transfer activity is suspected.

Figure 1:
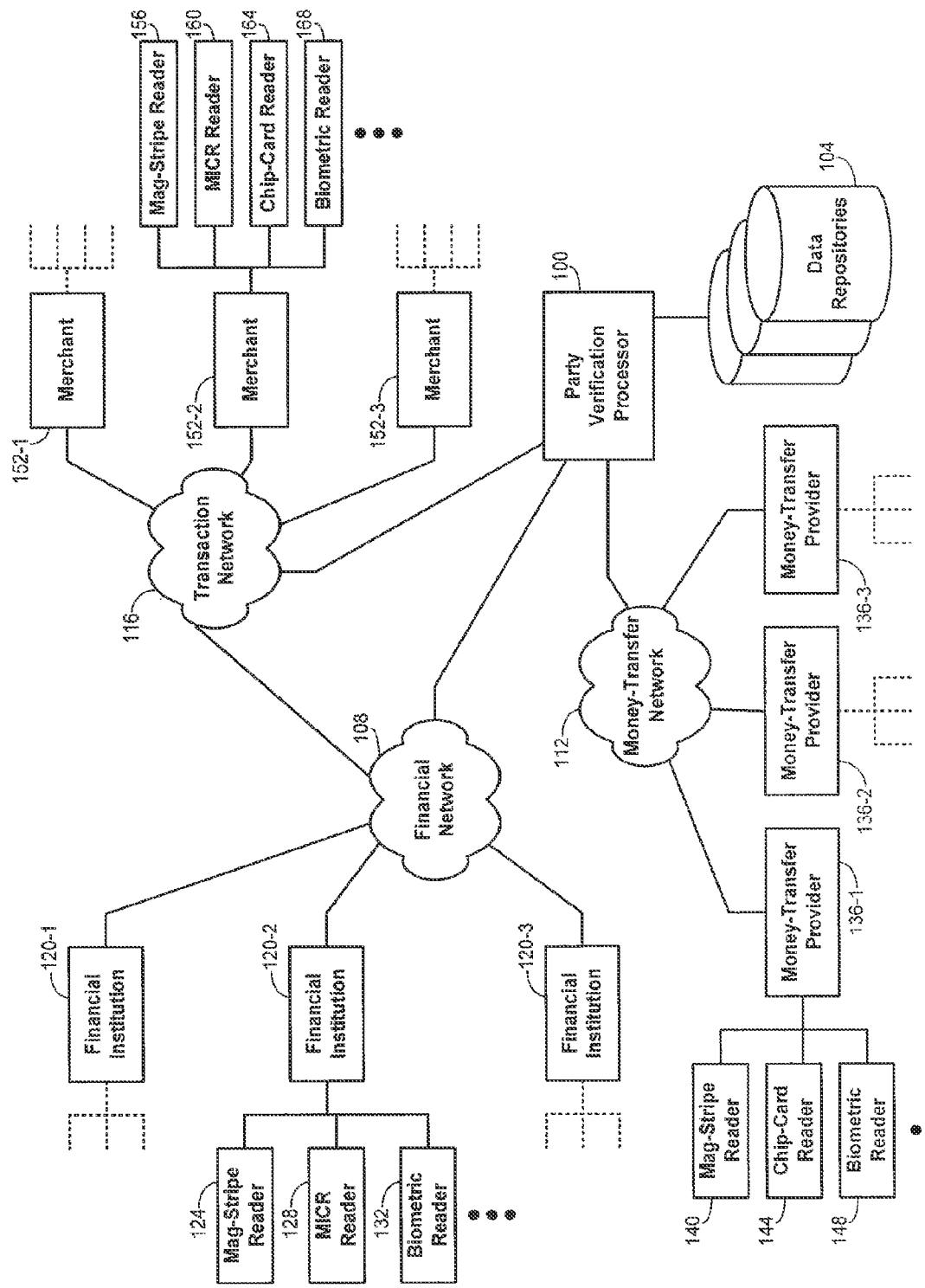
FIG. 1 shows a schematic overview of a financial network in which embodiments of the invention may be implemented.

The money transfer methods and system of the invention may be incorporated into an existing financial network to reduce implementation costs. FIG. 1 shows a schematic overview of a financial network in which embodiments of the invention may be implemented.

The structure of the architecture illustrated in FIG. 1 may be considered to surround a party verification processor 100 that has access to a number of data repositories 104 used to store information for verifying the identity of a party involved in a money transfer. The data repositories 104 may include a biometrics repository that comprises a database associating biometric parameters with identities of registrants. The biometric parameters may comprise raw biometric parameters, such as in embodiments where an entire fingerprint is stored or where a retinal pattern is stored. Alternatively, the biometric parameters may comprise derived biometric parameters, such as in embodiments where geometrical positions of fingerprint minutiae or other statistical characteristics of a raw biometric pattern are stored. More generally, the information stored in the biometrics repository may comprise any type of biometric information, including information that results from fingerprints or other dermatoglyphic patterns, hand or facial geometry, retinal or iris patterns, vein structure, and the like. In some embodiments, the biometrics repository stores multiple types of biometric information associated with a registrant.

The other data repositories 104 may include a variety of types of financial transaction information, which may also be associated with a registrant. The financial transaction information stored in the data repositories 104 may be obtained from a variety of different sources and subjected to statistical analyses using methods known in the art to identify irregularities characteristic of potential fraud. Thus, the data repositories 104 may also provide information used for fraud detection in financial transactions, as well as identity verification of a transaction participant (e.g., transferor, transferee, payor, payee, etc.).

Collection of biometric information and financial transaction information is facilitated with interfaces between the party verification processor 100 and a variety of financial networks, some of which are identified in FIG. 1 for illustrative purposes. For example, the party verification processor 100 may be interfaced with a financial network 108 through which communications with or among financial institutions 120 are routed. The financial institutions 120 may comprise a variety of different types of financial institutions, and embodiments of the invention are not limited by the specific types of financial services offered by the respective financial institutions 120. For example, the financial institutions 120 may comprise banks, credit unions, trust organizations, brokerage firms, and/or the like. Interactions by transaction participants with respective financial institutions may be effected with a number of different types of devices, some of which are indicated explicitly in the drawing. For example, magnetic-stripe readers 124 may be used to read a variety of different card instruments, including bank cards, credit cards, debit cards and the like, as well as identity instruments such as drivers' licenses that include magnetic-stripe cards. Magnetic-ink readers 128 may be used to read a variety of instruments that have information printed on them using magnetic ink, such as checks, deposit slips, and the like.

In addition to these type of devices, biometric readers 132 may be provided to collect biometric information from transaction participants. The specific design of the biometric readers 132 may vary, depending on the type of biometric to be collected. For example, fingerprints may be collected using optical fingerprint readers that use total internal reflection to discriminate between ridges and valleys in the surface structure of fingers. Facial geometry measurements may be collected using digital cameras coupled with computational units that perform eigenvalue analyses to extract characterizing features. Similar techniques may be performed using cameras to collect biometric retinal or iris information. Hand geometry measurements may be collected using a template over which a user places his hand, resulting in separation of the fingers, to permit cameras to acquire top and side views of the hand.

The party verification processor 100 may also be interfaced with a transaction network 116 through which transaction information may be routed both to the financial network 108 and to the party verification processor 100. The routing through the financial network 108 permits transaction information to be considered by financial institutions as described in further detail below to determine whether to approve or deny particular transactions by customers with merchants. The routing to the party verification processor 100 generally includes biometric information collected when the transaction is staged, permitting authentication of the biometric information by a centralized source. In some embodiments, particulars of the transaction are also routed to the party verification processor 100, which may then add such particulars and/or information derived from such particulars to the data repositories 104. This information then becomes part of the body of data that may be used by the party verification processor 100 to verify the identities of the transaction participants and/or identify patterns that may indicate a suspicious money transfer.

The money transfer systems of the invention include embodiments where the transferor and/or transferee conduct the transfer at a merchant location (e.g., a supermarket, a retail goods store, a restaurant, a gas station, an office services store, etc.). These embodiments may include having the transaction network 116 receive transaction information from merchants 152, each of which may in turn collect money transfer information at a point-of-transfer using a variety of different types of devices. Some of these devices are identified explicitly in FIG. 1, such as a magnetic-stripe reader 156, a magnetic-ink reader, a chip-card reader 164, and the like. The availability of multiple types of devices provides versatility in accepting and transferring different forms of money (e.g., physical cash, and checks, electronic money transfers, etc.) from transaction participants, and may sometimes simplify providing a self-service facility for executing transactions with the participants. These point-of-transfer devices may also function as point-of-sales devices that include multiple capabilities for identifying transaction instruments. Examples of these devices are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg ("the point-of-sale device applications"). Biometric information at a point-of-transfer may be collected using a biometric reader 168, which may have any of the structures described above in different embodiments, depending on the specific type of biometric information to be collected.

The party verification processor 100 may also be interfaced with a money-transfer network 112, over which currency-transfer transactions may be executed between conventional money-transfer providers 136. Again, each of the money-transfer providers 136 may have a number of different types of devices for collecting or providing funds in executing the money-transfer transactions, such as magnetic-stripe readers 140, chip-card readers 144, and the like. In some embodiments, such devices may be comprised by an integrated point-of-sale device as described in the point-of-sale device applications. Biometric information may be collected using a biometric reader 148 like those described above.

Figure 2:
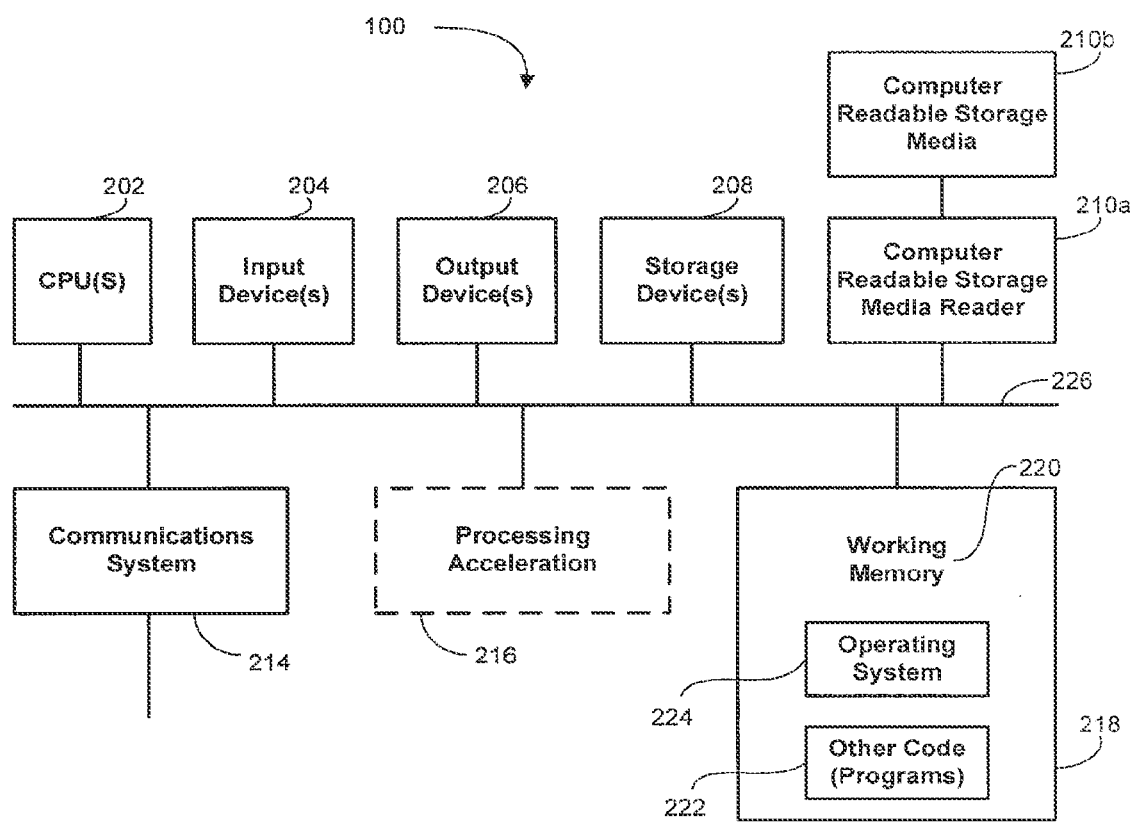
FIG. 2 illustrates a schematic structure for a party verification processor according to embodiments of the invention.

The party verification processor 100 may advantageously be embodied on a computational structure such as illustrated schematically in FIG. 2, which broadly illustrates how individual processor elements may be implemented in a separated or more integrated manner. The party verification processor 100 is shown comprised of hardware elements that are electrically coupled via bus 226. The hardware elements include a CPU 202, an input device 204, an output device 206, a storage device 208, a computer-readable storage media reader 210*a*, a communications system 214, a processing acceleration unit 216 such as a DSP or special-purpose processor, and a memory 218. The computer-readable storage media reader 210*a* is further connected to a computer-readable storage medium 210*b*, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with the transaction network 116, the financial network 108, and/or the money-transfer network 112.

The party verification processor 100 also comprises software elements, shown as being currently located within working memory 220, including an operating system 224 and other code 222, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 3:
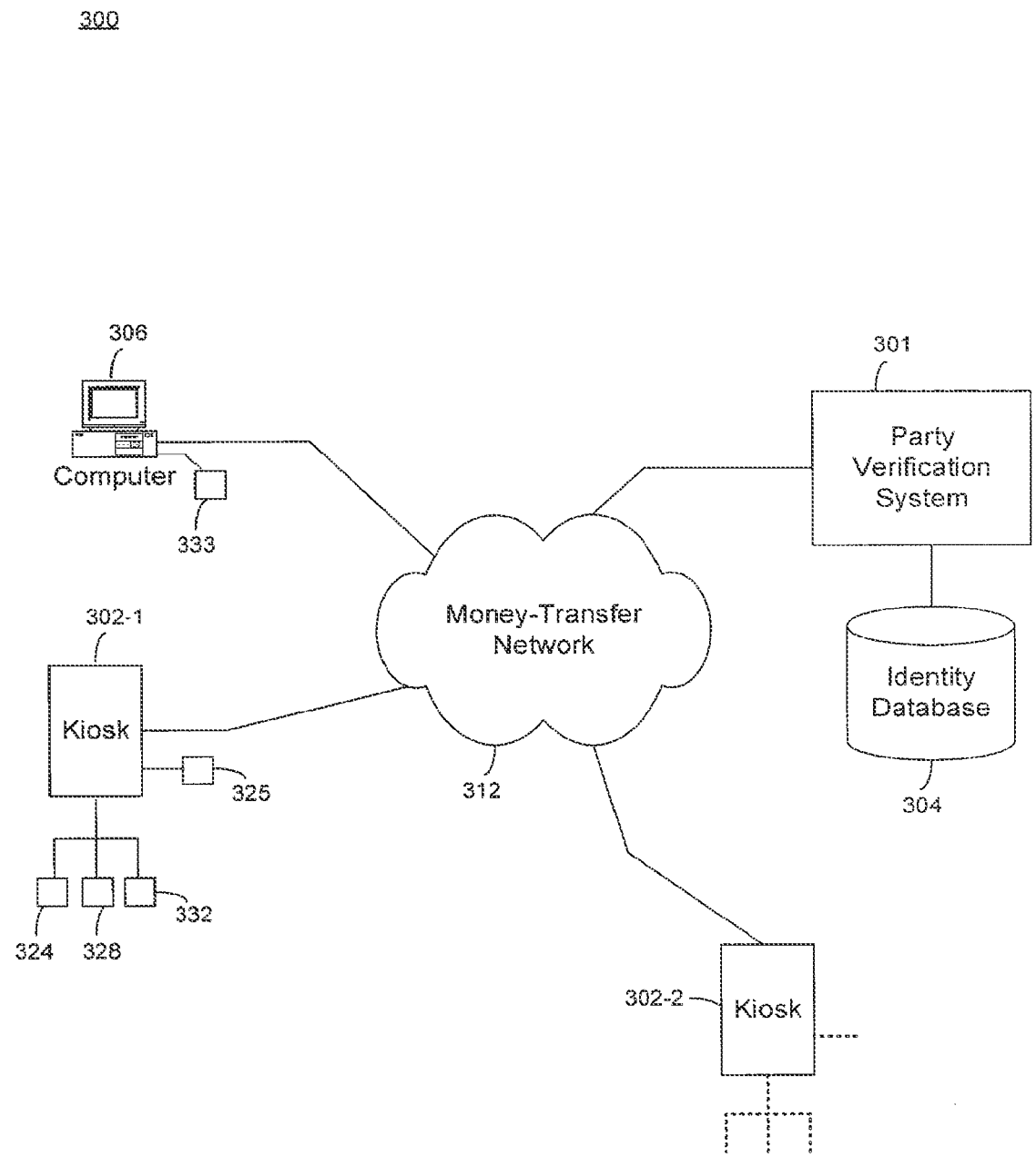
FIG. 3 shows a simplified overview of a network for transferring money according to embodiments of the invention.

Referring now to FIG. 3, an overview of portions of a structure 300 for transferring money through a money-transfer network 312 according to embodiments of the invention is shown. The portion of network 300 shown includes money transfer kiosks 302-1 and 302-2 that may be used to transfer money between a transferor and transferee in different locations (e.g., different states, countries, continents, etc.). The kiosks 302 may be equipped with inputs 324 to receive a variety of payment tokens and other payment instrument types, including bank cards, credit cards, debit cards and the like, as well as identity instruments such as drivers' licenses that include magnetic-stripe cards. Magnetic-ink readers 328 may be used to read a variety of instruments that have information printed on them using magnetic ink, such as checks, deposit slips, and the like. In addition, the kiosks 302 may include biometric readers 332 to collect biometric information from the transferor and transferee. Also, the kiosks 302 may include keyboards, keypads, microphones, cameras, etc. so the money transfer participants can manually input information about the transfer, including transfer identity information such as a money transfer transaction number (also called a money transfer control number) and/or the identity of the transferor and/or transferee. In some embodiments, the kiosks 302 may be derived from conventional automatic teller machines (ATMs), and may function as conventional ATMs that allow customers to deposit or withdraw money from a financial account.

When the kiosks 302 are being used for a money transfer according to embodiments of the invention, the transferor may input money and/or money transfer instructions into kiosk 302-1. This may involve the transferor inputting a payment token into input 324, which reads information from the token that identifies and transaction account and/or the identity of the transferor. The transferor may also provide physical cash to a cash input 325 of the kiosk 302-1. Alternatively (or in addition) the transferor may manually input an amount of money to be withdrawn from an account controlled by the transferor and sent to the transferee. The transferor may also manually input the identity of the transferee.

In addition, the transferor may input biometric information using the biometric readers 332. The biometric information may be sent to the party verification processor 301 to verify the identity of the transferor. The party verification processor 301 may compare the biometric information sent by the alleged transferor with previously recorded biometric information stored in database 304. The database 304 may include a biometrics repository for biometric parameters that are associated with the identities of transferors who have registered with the network 300. If the processor 301 can match the received and stored biometric information to a unique individual within a predefined margin of error, then the processor will deem the transferor's identity as verified and allow the transfer to proceed.

The money transferee may use kiosk 302-2 located in a different place than kiosk 302-1 to receive the money. The kiosk 302-2 may have the same functional elements as kiosk 302-1, which may be used by processor 301 to verify the identity of the transferee. This may include the transferee supplying biometric information to a biometric reader 332, which is then sent to processor 301 to verify the identity of the transferee. The transferee may also manually input transfer identity information such as a money transfer transaction number, the identity of the transferor and other information about the transfer (e.g., the amount of money transferred, etc.). This information may be required as an additional check before the transfer is completed to verify that the intended money transfer is being conducted.

The transferor may also input additional transfer instructions, such as an earliest time that the transferee can receive the money, and/or a time window when the transferee can receive the money, the location of the transfer, and/or even the specific identity of the kiosk 302-2. The network 300 may also be configured to allow the transferor to set up periodic transfers of money from a specified financial account. Once the transferor's identity has been verified by processor 301, the transferee can receive the money at the periodic intervals without further participation by the transferor. The transferee's identity may still be verified before each periodic transfer is received.

Money transfer network 300 may also be configured to allow personal computer 306 to kiosk 302-2 transfer. The transferor may authorize money transfers from a PC 306 located in a home or business. The PC 306 may be connected to a peripheral device that functions as a biometric reader 333 which allows the transferor to send biometric information to the processor 301. When the transferor's identity is verified by the processor 301, the transferor can manually input instructions into the PC 306 to authorize a transfer to the transferee from an account controlled by the transferor.

Figure 4:
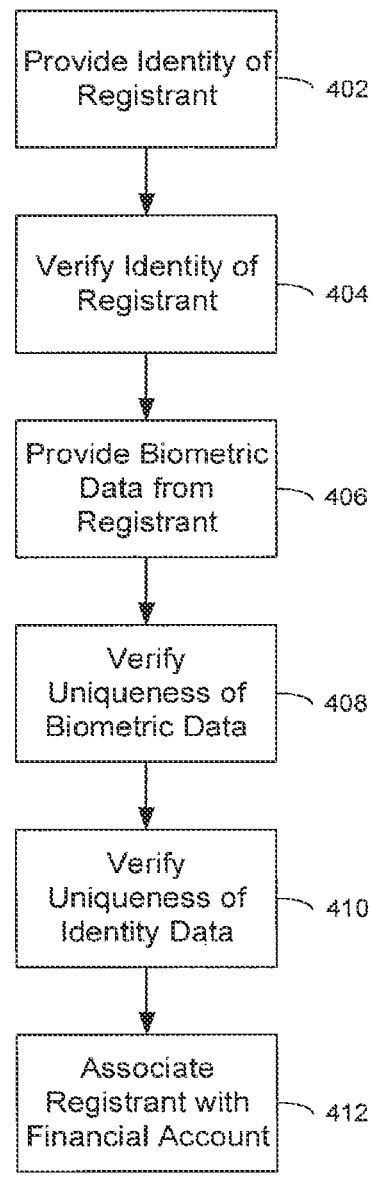
FIG. 4 is a flowchart for a method of registering biometric information according to embodiments of the invention.

FIG. 4 shows a flowchart for a method of registering biometric information according to embodiments of the invention. The method 400 includes inputting identity information of registrant 402 into an identity registration system that will associate the registrant's identity with biometric information supplied by the registrant. The identity information may include the registrant's name, home address, citizenship, gender, birthplace, birthdate, and/or social security number, among other types of identity information.

The registrant's identity information may be verified 404 by, for example, having the registrant produce one or more pieces of verification information to a person or system conducting the registration. Pieces of verification information that may be used to verify the identity of the registrant may include a drivers license, a green card, a social security card, a voter registration card, a birth certification, among other pieces of verification information. When the registrant's identity has been verified, the registrant may input one or more types of biometric information 406 into identity registration system that will be associated with the identity. The biometric information supplied by the registrant may include a fingerprint information, handprint information, voice print information, retinal image information, facial scan information, and/or handwriting information, among other kinds of biometric information.

Once the identity information and biometric information are provided, the identity registration system may verify that the biometric information is unique to the identified registrant 408. This will prevent a party verification processor or some other identity verification system from identifying the wrong party based on the biometric data. This also serves as a security check against identity theft by someone who tries to associate their biometric data with multiple different identities. Similarly, the identity registration system may verify that the identity of the registrant is unique 410. The system may verify that the identity information supplied during registration has not already been used to register someone who has supplied different biometric information.

Method 400 may also include associating the identity and/or biometric information with one or more financial accounts 412. This association could, for example, allow a registrant to authorized transfers from an associated financial account just by supplying biometric information that verifies the account holder's identity. This may allow money transfers between transferor and transferees that do not require either participant to have a payment token to complete the transaction.

Figure 5:
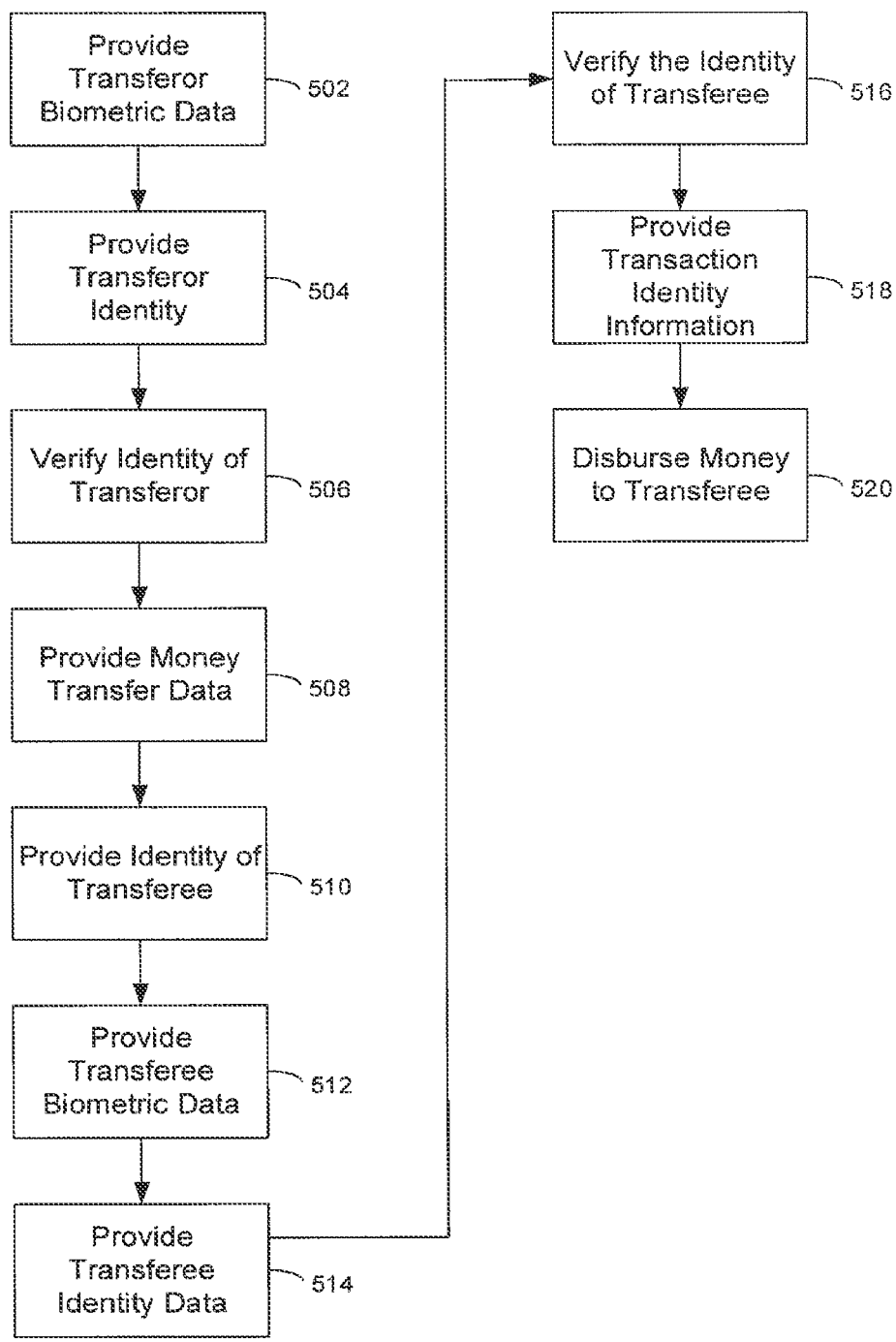
FIG. 5 is a flowchart for a method of transferring money according to embodiments of the invention.

Referring now to FIG. 5, a flowchart for a method 500 of transferring money according to embodiments of the invention is shown. The method 500 may include having a money transferor provide biometric information 502 and the transferor's identity 504 to an identity verification system. The system may compare the biometric information to previously provided biometric information to verify the identity of the transferor 506. The transferor may have provided the previous biometric information during a registration process that associated the biometric information with a verified identity of the registrant, as described in FIG. 4. When the registration process also includes associating the registrant with one or more financial accounts, the transferor may authorize a transfer of money from an associated account without having to fill out a transfer form or other paperwork.

The method 500 may also include having the transferor input money transfer information 508. The money transfer information may include an amount of money to be transferred, the source of funds for the transfer (e.g., physical money provided by the transferor, an account controlled by the transferor, etc.) and/or the time and location for executing the transfer, among other information. The transferor may also input transfer identity information 510 as part of the money transfer information. The transferee may be an individual or an organization. When the transferee is an organization, the transferor may input the identity of an authorized person who can receive the money on behalf of the organization. Alternatively (or in addition) the identity verification system may include a list of persons who can act as authorized transferees associated with the organization. When the transferor inputs the name of the transferee organization, any one of the authorized transferees may receive the money on behalf of the organization once his or her identity is verified.

The transferor may view a display or receive a printed receipt that confirms the authorization of the money transfer. The information displayed and/or printed may include a money transaction transfer number that uniquely identifies the money transfer. The transferor can then call, mail, email, or otherwise communicate the transfer number to the transferee, who may need to provide the number in order to receive the money.

When the transferee is ready to receive the money, he or she provides biometric information 512 and identity information 514 to the identity verification system. The system uses this information to verify the identity of the transferee 516 before the money is released. In addition, the system may require the transferee to provide transfer identity information 518, before the money is released to the transferee 520. The transferee may provide the identity of the transferor in a number of ways, depending on how the money is given to the transferee. When a person is involved in disbursing the money, the transferee may speak the identity of the transferor to that person in order to receive the money. When a kiosk or some other machine is used to disburse the money, the transferee may type the identity of the transferor into a keypad or keyboard that communicates with the machine.

It should be appreciated that numerous variations on the methods 400 and 500 are also contemplated as embodiments of the invention. For example the order in which biometric information and money transfer information are provided by the transferor may be switched. Similarly, the transferee may provide the identity of the transferor either before or after providing biometric information to verify the identity of the transferee. The transferee may receive one portion of the money sent by the transferor as physical money (i.e., cash), and another portion electronically as a credit in a financial account or on a payment card. These and other variations are also included in the invention.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a," "an," and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method comprising the steps of:
   receiving a biometric characteristic and identity information of a transferor;
   verifying the identity information of the transferor using one or more pieces of verification information provided by the transferor;
   comparing the biometric characteristic to each of a plurality of individual biometric characteristics in a database, wherein each of the plurality of individual biometric characteristics is associated with a previously registered person;
   comparing the identity information to each of a plurality of individual identifications in the database, wherein each of the plurality of individual identifications is associated with a previously registered person; and
   registering the transferor by recording the biometric characteristic and the identity information in the database based at least on:
      the biometric characteristic being unique because it did not match any of the plurality of individual biometric characteristics in the database; and
      the identity information being unique because it did not match any of the plurality of individual identifications in the database.

2. A system comprising:
   a party verification processor, wherein the party verification processor is configured to:
      receive a biometric characteristic and identity information of a transferor;
      verify the identity information of the transferor using one or more pieces of verification information provided by the transferor;
      compare the biometric characteristic to each of a plurality of individual biometric characteristics in a database, wherein each of the plurality of individual biometric characteristics is associated with a previously registered person;
      compare the identity information to each of a plurality of individual identifications in the database, wherein each of the plurality of individual identifications is associated with a previously registered person; and
      register the transferor by recording the biometric characteristic and the identity information in the database based at least on:
         the biometric characteristic being unique based because it did not match any of the plurality of individual biometric characteristics in the database; and
         the identity information being unique because it did not match any of the plurality of individual identifications in the database.

3. The method of claim 1, further comprising the steps of:
   receiving a funds transfer request from the transferor, the request including biometric information; and
   causing transfer of funds based at least on the biometric information corresponding with the recorded biometric characteristic.

4. The method of claim 3, wherein the funds transfer request further includes an identification of a transferee, and the method further comprises:
   storing a list of persons who are authorized to collect funds on behalf of the transferee; and
   receiving, from a requesting recipient, a request to receive funds associated with the funds transfer request; and
   verifying the requesting recipient is in the list of persons prior to distributing funds to the requesting recipient.

5. The method of claim 1, wherein the biometric characteristic comprises geometrical positions of fingerprint minutiae.

6. The method of claim 3, wherein the funds transfer request is associated with a money transfer transaction number.

7. The method of claim 6, wherein the money transfer transaction number comprises an alpha-numeric code number.

8. The method of claim 6, wherein the money transfer transaction number uniquely identifies the money transfer.

9. The system of claim 2, wherein the system further comprises a money transfer network and the money transfer network is configured to:
   receive a funds transfer request from the transferor, the request including biometric information; and
   cause transfer of funds based at least on the biometric information corresponding with the recorded biometric information.

10. The system of claim 9, wherein the funds transfer request further includes an identification of a transferee, and the money transfer network is further configured to:
    store a list of persons who are authorized to collect funds on behalf of the transferee; and
    receive, from a requesting recipient, a request to receive funds associated with the funds transfer request; and
    verify the requesting recipient is in the list of persons prior to distributing funds to the requesting recipient.

11. The system of claim 2, wherein the biometric characteristic comprises geometrical positions of fingerprint minutiae.

12. The system of claim 9, wherein the funds transfer request is associated with a money transfer transaction number.

13. The system of claim 12, wherein the money transfer transaction number comprises an alpha-numeric code number.

14. The system of claim 12, wherein the money transfer transaction number uniquely identifies the money transfer.

15. One or more non-transitory machine readable mediums having instructions stored thereon, the instructions executable by one or more processors to:
    receive a biometric characteristic and identity information of a transferor;
    verify the identity information of the transferor using one or more pieces of verification information provided by the transferor;
    compare the biometric characteristic to each of a plurality of individual biometric characteristics in a database, wherein each of the plurality of individual biometric characteristics is associated with a previously registered person;
    compare the identity information to each of a plurality of individual identifications in the database, wherein each of the plurality of individual identifications is associated with a previously registered person; and
    register the transferor by recording the biometric characteristic and the identity information in the database based at least on:
       the biometric characteristic being unique based because it did not match any of the plurality of individual biometric characteristics in the database; and
       the identity information being unique because it did not match any of the plurality of individual identifications in the database.

16. The non-transitory machine readable medium(s) of claim 15, the instructions further executable by one or more processors to:
    receive a funds transfer request from the transferor, the request including biometric information; and
    cause transfer of funds based at least on the biometric information corresponding with the recorded biometric characteristic.

17. The non-transitory machine readable medium(s) of claim 16, the instructions further executable by one or more processors to:
    store a list of persons who are authorized to collect funds on behalf of the transferee; and
    receive, from a requesting recipient, a request to receive funds associated with the funds transfer request; and
    verify the requesting recipient is in the list of persons prior to distributing funds to the requesting recipient.

18. The non-transitory machine readable medium(s) of claim 15, wherein the biometric characteristic comprises geometrical positions of fingerprint minutiae.

19. The non-transitory machine readable medium(s) of claim 16, wherein the funds transfer request is associated with a money transfer transaction number.

20. The non-transitory machine readable medium(s) of claim 19, wherein the money transfer transaction number comprises an alpha-numeric code number.

* * * * *